(12) United States Patent
Luo

(10) Patent No.: US 8,173,730 B2
(45) Date of Patent: May 8, 2012

(54) ENVIRONMENTALLY FRIENDLY MATERIAL USED FOR MAKING PENS

(75) Inventor: Ronghua Luo, Ningbo (CN)

(73) Assignee: Beifa Group Co., Ltd., Ningbo (CN)

( * ) Notice: Subject to any disclaimer, the term of this patent is extended or adjusted under 35 U.S.C. 154(b) by 62 days.

(21) Appl. No.: 12/580,133

(22) Filed: Oct. 15, 2009

(65) Prior Publication Data

US 2010/0099808 A1    Apr. 22, 2010

(30) Foreign Application Priority Data

Oct. 16, 2008    (CN) .......................... 2008 1 0121751

(51) Int. Cl.
*C08G 18/77*    (2006.01)
(52) U.S. Cl. ......... 524/115; 524/425; 524/599; 401/209
(58) Field of Classification Search ................... 524/115
See application file for complete search history.

(56) References Cited

U.S. PATENT DOCUMENTS

2004/0157967 A1 *    8/2004    Ito .................................. 524/109

OTHER PUBLICATIONS

Plastics Additives and Compounding, Biopolymers Present New Market Opportunities for Additives in Packaging, May/Jun. 2008, pp. 22-25.*
Schut, J, Plastics Technology, Recycled PTE/PE Alloys Show Promise in Monofilament, Pallets, Pipe, May 2004, pp. 1-4.*

* cited by examiner

*Primary Examiner* — Doris Lee
(74) *Attorney, Agent, or Firm* — Christensen O'Connor Johnson Kindness PLLC

(57) ABSTRACT

A biodegradable polylactic acid material being suitable for the manufacture of articles, such as pens, is the heated mixed product of the following components, 93% by weight to 96% by weight polylactic acid, 0.8% by weight to 1.2% by weight of a chain extender, 0.6% by weight to 1.0% by weight of a nucleating agent, and 2.5% by weight to 5.0% by weight of a filler.

14 Claims, No Drawings

ENVIRONMENTALLY FRIENDLY MATERIAL USED FOR MAKING PENS

BACKGROUND

Pens being used today are mostly made of plastics or metals. Plastics are not likely to be subject to corrosion and can pollute the environment when discarded. Although metal can be reclaimed, the cost is high, and pens made from metal are not competitive with respect to cost in the market. A current trend in manufacturing is to substitute an environmentally friendly material for plastics. Polylactic acid (PLA) is a high molecular synthetic material with excellent biocompatibility and biodegradability. Polylactic acid is made from starch extracted from plants such as, corn, wheat, cassava, and so on. After the starch is degraded in the presence of an enzyme to obtain glucose, the glucose is fermented in the presence of lactobacillus to produce lactic acid. Finally, high purity polylactic acid is obtained through chemosynthesis. After polylactic acid products are discarded, the products are completely degraded into carbon dioxide and water under the action of microorganisms, water, acid, and alkali within three months after being in the soil or water. Subsequently, through photosynthesis, the carbon dioxide and water become the raw materials for starch in plants, thus avoiding polluting the environment. Accordingly, polylactic acid is a biodegradable material which is completely naturally recycled within the environment.

However, as polylactic acid contains a great many ester linkages and is weakly hydrophilic, biocompatibility with other materials is low. In addition, polylactic acid is a linear polymer and the range of the molecular weights of the polymerization products is too wide. This reduces the strength of the polylactic acid and fails to meet strength requirements for many products. Polylactic acid is a brittle material, the temperature leading to thermal distortion is low (54° C. under load), the shock resistance is poor, and the degrading periods are difficult to control. Pens made of conventional polylactic acid materials crack easily during production and assembly. In addition, as polylactic acid crystallizes slowly during injection molding, production efficiency is very low. In its conventional form, polylactic acid is not applicable to batch production, and the pens made of polylactic acid fail to meet the requirements for transportation in containers and routine storage.

Accordingly, in order for polylactic acid to be useful in making biodegradable articles, such as pens, new polylactic acid materials must be developed that overcome these problems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention provides an environmentally friendly biodegradable polylactic acid material with performance characteristics meeting requirements suitable for making articles, such as pens and applicable to batch production methods.

In one embodiment, the environmentally friendly material includes the heated mixed product of, 93% to 96% by weight polylactic acid, 0.8% to 1.2% by weight of a chain extender, 0.6% to 1.0% by weight of a nucleating agent and, 2.5% to 5% by weight of a filler.

In another embodiment, the environmentally friendly material includes the heated mixed product of, about 94% by weight polylactic acid, about 1.2% by weight of a chain extender, about 0.8% by weight of a nucleating agent, and about 4.0% by weight of a filler.

In another embodiment, the environmentally friendly material consists essentially of the heated mixed product of, 93% by weight to 96% by weight polylactic acid, 0.8% by weight to 1.2% by weight of a chain extender, 0.6% by weight to 1.0% by weight of a nucleating agent, and 2.5% by weight to 5.0% by weight of a filler.

In another embodiment, the environmentally friendly material is made by the process comprising: feeding to an extruder, components including, 93% by weight to 96% by weight polylactic acid, 0.8% by weight to 1.2% by weight of a chain extender, 0.6% by weight to 1.0% by weight of a nucleating agent, and 2.5% by weight to 5.0% by weight of a filler; extruding the components at a temperature of approximately 170° C.; cooling the extruded components; and granulating the cooled components.

In the disclosed embodiments above, the nucleating agent can include an aryl-phosphate nucleating agent.

In the disclosed embodiments above, the aryl-phosphate nucleating agent can include 12H-dibenzo[d,g][1,3,2]dioxaphosphocin,2,4,8,10-tetrakis(1,1-dimethylethyl)-6-hydroxy-6-oxide, sodium salt.

In the disclosed embodiments above, the chain extender can include a styrene-acrylic oligomer.

In the disclosed embodiments above, the environmentally friendly material can be granulated.

In the disclosed embodiments above, the filler can be calcium carbonate.

The polylactic acid compositions disclosed herein can provide an environmentally friendly material useful for making articles, such as pens. The material is the heated mixed product made from polylactic acid, one or more chain extenders, one or more nucleating agents, and one or more fillers mixed in accordance with the proportions stated herein. The nucleating agent is capable of improving the injection crystallization speed of the polylactic acid and the temperature resistance of the polylactic acid. The chain extender is capable of preventing the polylactic acid from being degraded during production and also maintains the stability of the polylactic acid. The strength and toughness characteristics of pens made with the environmentally friendly material are sufficient to withstand production and assembly without breaking or distortion. In addition, the material crystallizes quickly, which leads to high production efficiency, and allows the material to be applicable to batch production. Furthermore, the temperature leading to thermal distortion of the polylactic acid is increased to above 65° C. from the previous 54° C. Accordingly, the material can meet the requirements for transportation in containers and routine storage.

DETAILED DESCRIPTION

The manufacturing method for making a polylactic acid material that is environmentally friendly is disclosed. The manufacturing method includes steps (1) through (5) below.

(1) Polylactic resin is dehumidified and dried under a low temperature environment of 40-50° C.

(2) The components of the environmentally friendly polylactic acid material are added to an extruder according to the following proportions: about 93% by weight of the dried and dehumidified polylactic acid, about 1% by weight of a chain extender, about 1% by weight of a transparent aryl-phosphate-type nucleating agent, and about 5% by weight of a filler.

(3) The components are fed to a double screw extruder. The components are extruded and then cooled. The extruding temperature is approximately 170 degrees Celsius. The extruded material is then cooled with water in a jacketed vessel to room temperature.

(4) The extruded and cooled material is then granulated.

(5) The granulated material is dehumidified and dried and then sealed and packaged.

In another embodiment, the manufacturing process is similar to that of the first embodiment except with respect to step (2), which includes using the following proportions of components: about 94% by weight of the polylactic acid, about 1.2% by weight of the chain extender, about 0.8% by weight of the transparent aryl-phosphate-type nucleating agent, and about 4% by weight of the filler.

In another embodiment, the manufacturing process is similar to that of the first embodiment except with respect to step (2) which includes using the following proportions of components: about 95% by weight of the polylactic acid, about 0.8% by weight of the chain extender, about 1% by weight of the transparent aryl-phosphate-type nucleating agent, and about 3.2% by weight of the filler.

In another embodiment, the manufacturing process is similar to that of the first embodiment except with respect to step (2) which includes using the following proportions of the mixture: about 96% by weight of the polylactic acid, about 0.9% by weight of the chain extender, about 0.6% by weight of the transparent aryl-phosphate-type nucleating agent, and about 2.5% by weight of the filler.

One representative polylactic acid suitable for use in the disclosed embodiments is known under the designation R201, by Zhejiang Hisun Biomaterials Company, Ltd. However, other well known commercially available polylactic acid raw materials may be used. The polylactic acid is chosen for its properties, such as strength, easy processing and degradation.

The chain extender improves the properties of the polylactic acid. The chain extender is capable of preventing the polylactic acid from being degraded during production and also maintains the stability of the polylactic acid. As the chain extender in the disclosed embodiments, one or more chain extenders may be used to make the polylactic acid materials. Representative chain extenders for use in the disclosed embodiments include, but are not limited to one or more of the commercially available chain extenders in the series known under the designation ADR, produced by BASF, such as ADR-4370. The ADR series of chain extenders are characterized as highly functional styrene-acrylic oligomers.

The nucleating agent is capable of improving the crystallization speed of the polylactic acid and the temperature resistance of the polylactic acid. As the nucleating agent in the disclosed embodiments, one or more nucleating agents may be used to make the polylactic acid materials. Aryl-phosphate-type nucleating agents are a class of compounds that may be used. One representative aryl-phosphate-type nucleating agent for use in the disclosed embodiments, which is transparent, is known under the designation ADK Stab NA-11 by Asahi Denka of Japan. This transparent aryl-phosphate-type nucleating agent is known by the chemical names 12H-dibenzo[d,g][1,3,2]dioxaphosphocin,2,4,8,10-tetrakis(1,1-dimethylethyl)-6-hydroxy-6-oxide, sodium salt; and 2,2'-methylenebis(4,6-di-tert-butylphenol) phosphate sodium salt. The molecular formula is $C_{29}H_{43}O_4P\cdot Na$.

As the filler for use in the disclosed embodiments, calcium carbonate singly or in combination with other fillers may be used. Calcium carbonate is a functional filler that may be used to improve strength, as a processing aid or to replace the more expensive resins.

While illustrative embodiments have been illustrated and described, it will be appreciated that various changes can be made therein without departing from the spirit and scope of the invention.

The embodiments of the invention in which an exclusive property or privilege is claimed are defined as follows:

1. A pen, made from a material, wherein the material comprises the heated mixed product of:
   93% by weight to 96% by weight polylactic acid;
   0.8% by weight to 1.2% by weight of a chain extender;
   0.6% by weight to 1.0% by weight of a nucleating agent; and
   2.5% by weight to 5.0% by weight of a filler, wherein the material is granulated and is stabilized against thermal distortion to a temperature above 65° C.

2. The pen of claim 1, wherein the material comprises the heated mixed product of:
   about 94% by weight polylactic acid;
   about 1.2% by weight of a chain extender;
   about 0.8% by weight of a nucleating agent; and
   about 4.0% by weight of a filler.

3. The pen of claim 1, wherein the material is biodegradable.

4. The pen of claim 1, wherein the nucleating agent is an aryl-phosphate nucleating agent.

5. The pen of claim 1, wherein the nucleating agent is 12H-dibenzo [d,g][1,3,2] dioxaphosphocin,2,4,8,10-tetrakis(1,1-dimethylethyl)-6-hydroxy-6-oxide, sodium salt.

6. The pen of claim 1, wherein the chain extender is a styrene-acrylic oligomer.

7. The pen of claim 1, wherein the filler is calcium carbonate.

8. A pen made from a material, wherein the material consisting consists essentially of the heated mixed product of:
   93% by weight to 96% by weight polylactic acid;
   0.8% by weight to 1.2% by weight of a chain extender;
   0.6% by weight to 1.0% by weight of a nucleating agent; and
   2.5% by weight to 5.0% by weight of a filler, wherein the material is granulated and is stabilized against thermal distortion to a temperature above 65° C.

9. The pen of claim 8, wherein the material is biodegradable.

10. The pen of claim 8, wherein the nucleating agent is an aryl-phosphate nucleating agent.

11. The pen of claim 8, wherein the nucleating agent is 12H-dibenzo [d,g][1,3,2] dioxaphosphocin,2,4,8,10-tetrakis(1,1-dimethylethyl)-6-hydroxy-6-oxide, sodium salt.

12. The pen of claim 8, wherein the chain extender is a styrene-acrylic oligomer.

13. The pen of claim 8, wherein the filler is calcium carbonate.

14. A biodegradable pen made by the process comprising:
   feeding to an extruder, components including, 93% by weight to 96% by weight polylactic acid, 0.8% by weight to 1.2% by weight of a chain extender, 0.6% by weight to 1.0% by weight of a nucleating agent, and 2.5% by weight to 5.0% by weight of a filler;
   extruding the components at a temperature of approximately 170° C.;
   cooling the extruded components;
   granulating the cooled components to produce a polylactic acid composition that is stabilized against thermal distortion to a temperature above 65° C. and
   using the granulated polylactic acid composition in the production of the pen.

* * * * *